United States Patent [19]

Membrino

[11] Patent Number: 4,670,083

[45] Date of Patent: Jun. 2, 1987

[54] BINDER FOR BAG PADS

[76] Inventor: Hercules Membrino, 280 Paoli Pike, Malvern, Pa. 19355

[21] Appl. No.: 839,978

[22] Filed: Mar. 17, 1986

[51] Int. Cl.[4] .............................................. B32B 31/18

[52] U.S. Cl. .................................... 156/510; 156/251; 156/513; 156/515; 493/204

[58] Field of Search ............... 156/251, 510, 513, 515; 493/204

[56] References Cited

U.S. PATENT DOCUMENTS 4,468,276 8/1984 Membrino ...................... 156/513 X 4,526,639 7/1985 Reimann ......................... 156/515 X

*Primary Examiner*—Robert A. Dawson

*Attorney, Agent, or Firm*—Arthur A. Jacobs

[57] ABSTRACT

A binding machine for binding together a stack of individual bags to form a pad of bags by connecting the bags together at corresponding selvage portions adjacent the mouths of the bags, comprising a reciprocable side sealing means and, optionally, a reciprocable rear edge sealing means, a conveyor for the bags that is optionally movable either from front to rear of the machine or laterally of the machine, stop means for holding the stack of bags in a predetermined position for binding, and means for timing the reciprocable sealing means and the stop means to permit continuous but intermittant progression of a plurality of stacks of bags through the sealing cycle.

14 Claims, 13 Drawing Figures

FIG. 3
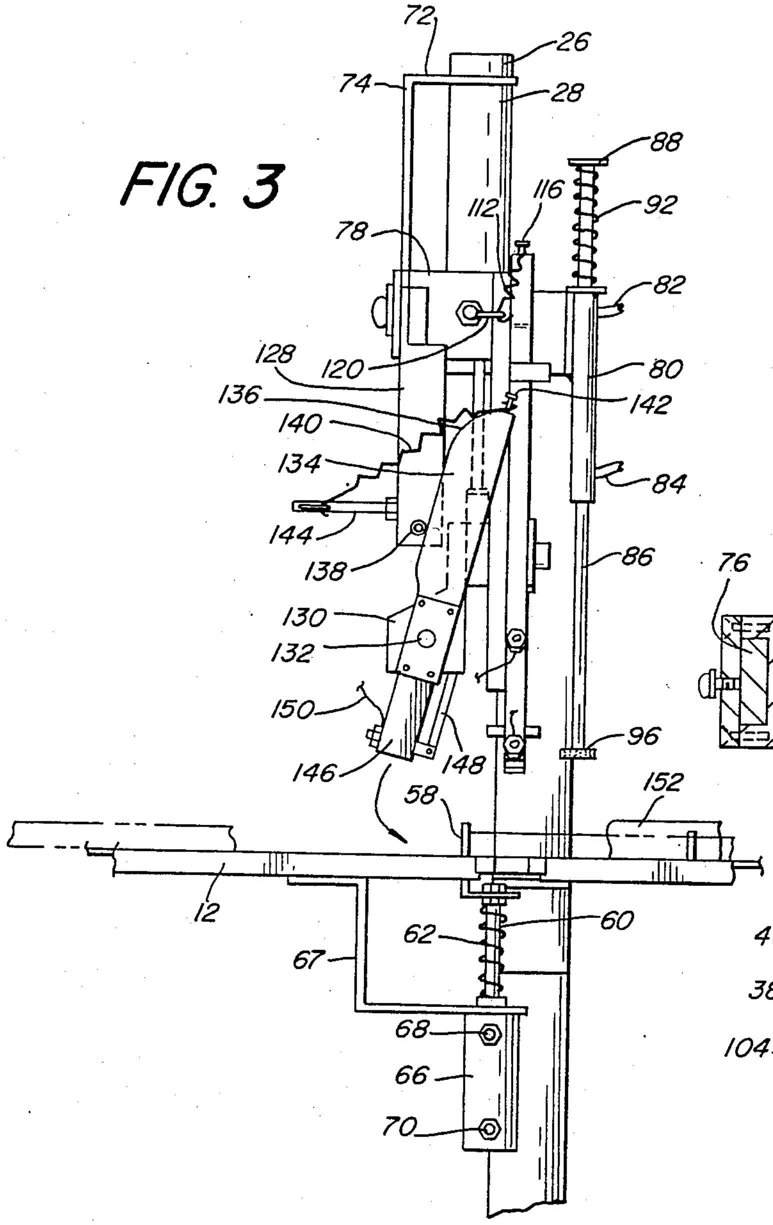
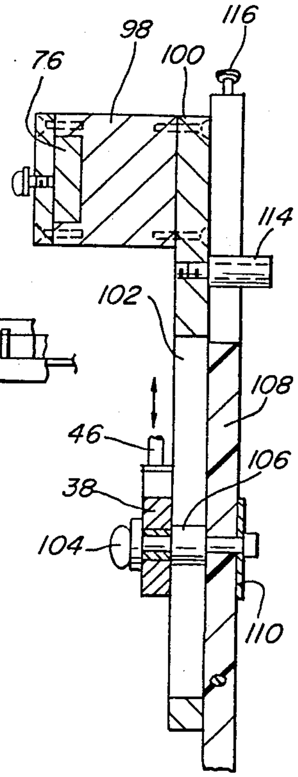
FIG. 6

FIG. 7
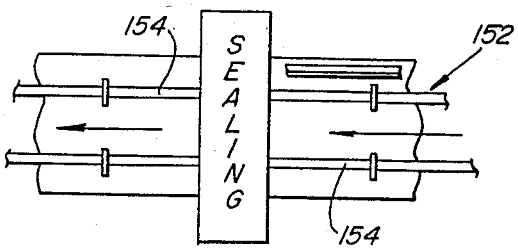
FIG. 8
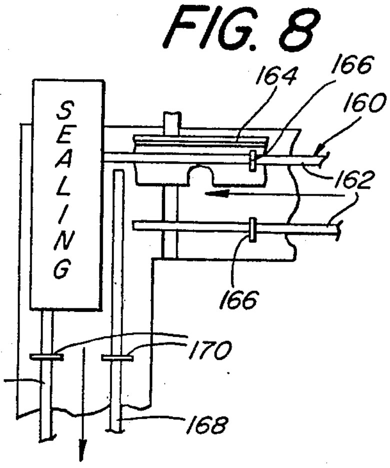
FIG. 10
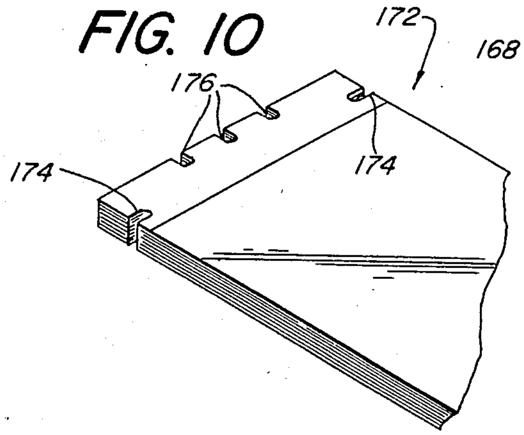
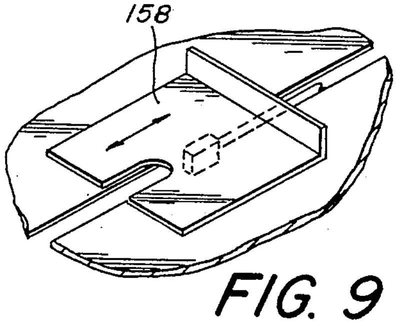
FIG. 9
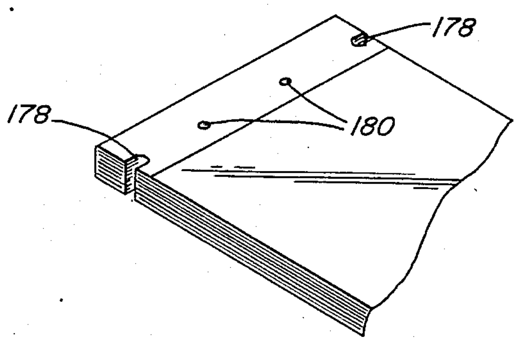
FIG. 11

FIG. 12
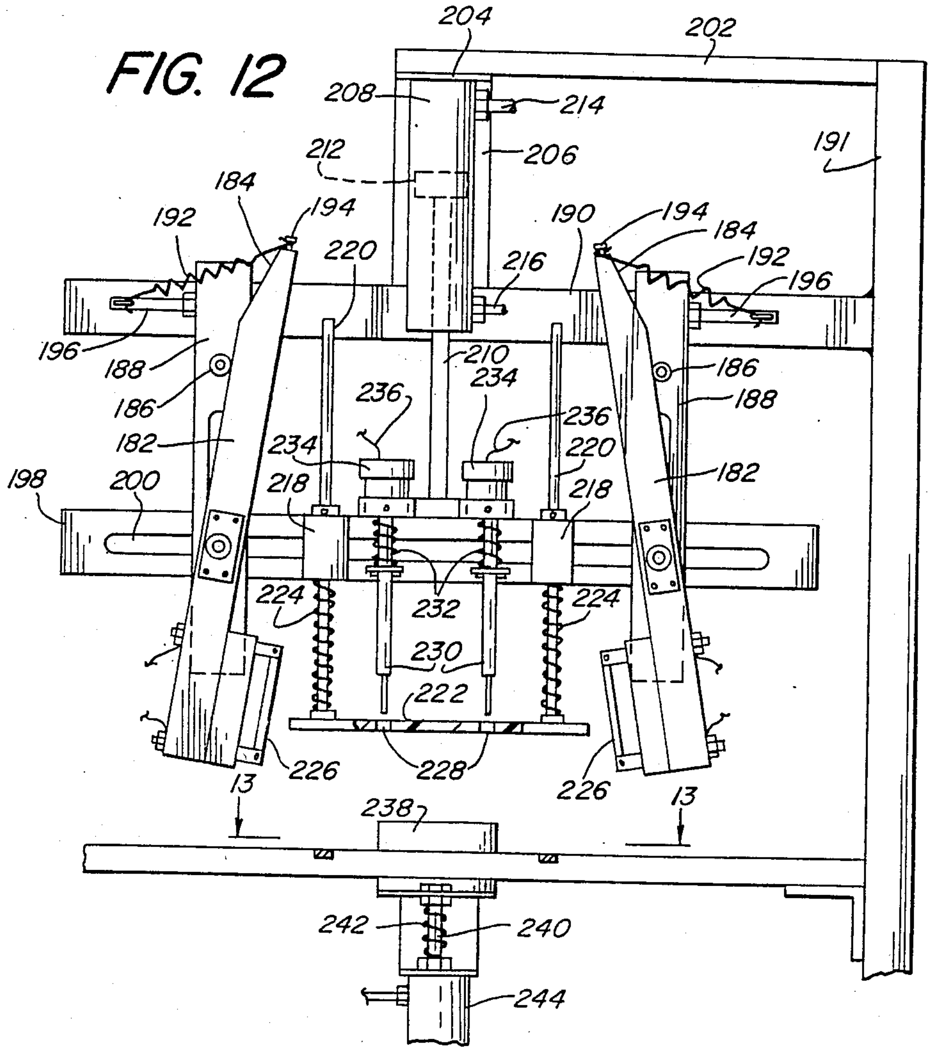
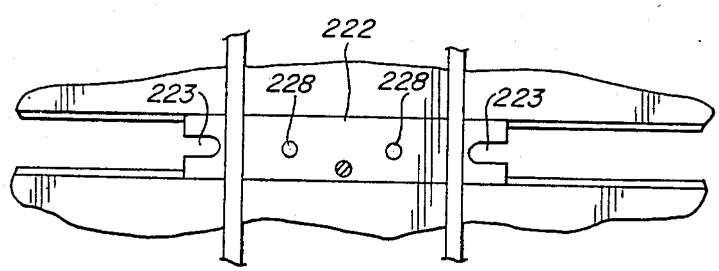
FIG. 13

BINDER FOR BAG PADS

This invention relates to a machine for binding bags together to form a pad, and it particularly relates to a machine of the aforesaid type that is capable of being used in a continuous process.

Machines of the aforesaid general type have been used heretofore, as illustrated, for example, in applicant's prior U.S. Pat. No. 4,468,276, dated Aug. 28, 1984. That patent and the references cited therein show the state of the prior art.

The machine shown in the aforesaid U.S. Pat. No. 4,468,276 operates very satisfactorily for its purpose. However, it cannot be used in a continuous process between a bag making machine and a bag pad wrapping machine because the pads, after they have been formed, must be removed by hand and a new stack of bags inserted. This has made the process less economical and the resultant products more expensive.

It is an object of the present invention to provide a pad binding machine of the general type shown in U.S. Pat. No. 4,468,276 which is adapted to be used in a continuous, though intermittant, manner without the necessity to hand-feed the stacks of bags to be bound.

Another object of the present invention is to provide a pad binding machine of the aforesaid type that is relatively simple and easy to use.

Other objects and many of the attendant advantages of this invention will be readily appreciated as the same becomes better understood by reference to the following description when read in conjunction with the accompanying drawings wherein:

FIG. 3 is a side elevational view of the machine of FIG. 1.

FIG. 6 is a sectional view taken on line 6—6 of FIG. 2.

FIG. 7 is fragmentary, somewhat schematic top plan view showing the relationship between the conveyor belts and the sealing head.

FIG. 8 is a view similar to FIG. 2 but showing an alternative form of the invention.

FIG. 9 is a top perspective view of a reciprocating tray used for carrying the stack of bags to be bound.

FIG. 10 is a fragmentary perspective view of one type of bound pad.

FIG. 11 is a fragmentary view of another type of bound bag made by a modified form of the invention.

FIG. 12 is a front elevational view of a modified form of the invention.

FIG. 13 is a sectional view taken on line 13—13 of FIG. 12.

Figure 1:
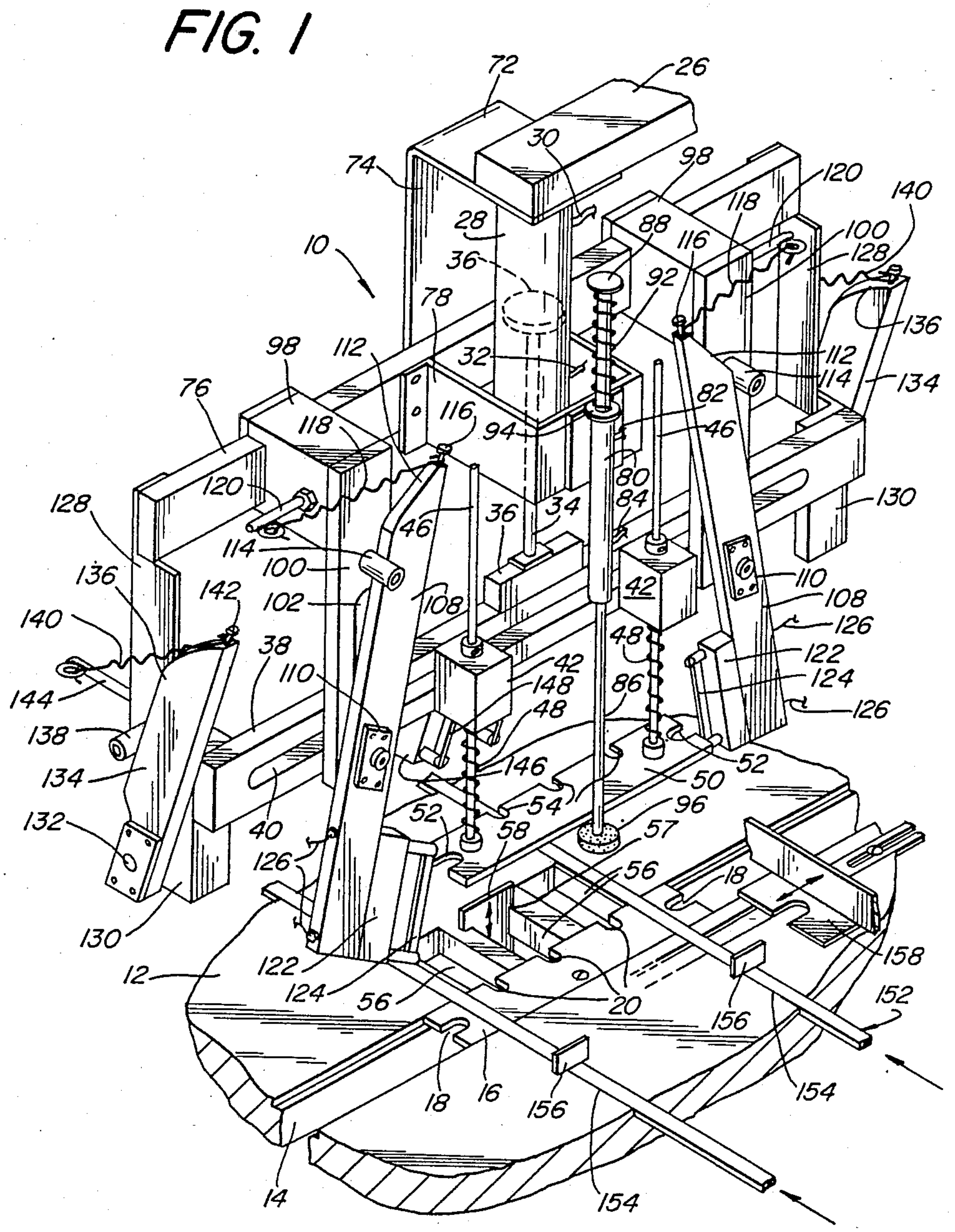
FIG. 1 is a front perspective view of a bag pad binding machine embodying the present invention.

Referring in greater detail to the drawings wherein similar reference characters refer to similar parts, there is shown in FIG. 1 a bag pad binding machine, generally designated 10, comprising a platform 12 having a lateral groove 14 in which is provided a guide plate 16. The plate 16 is provided with a pair of oppositely-disposed end slots 18 and three rear slots 20 on its rear edge. The platform 12 is supported on an open table 22 (see FIG. 2) from which upwardly extends a post 24 at one side of the machine. A flange 26 at the upper end of the post supports a cylinder 28 having upper and lower ports for ingress and egress of air or other fluid under pressure to and from a tank (not shown) by means of conduits 30 and 32. A piston 34, having a head 36 moves within the cylinder between the ports, and is provided at its lower end with a block 36 to which is connected a guide bar 38.

The bar 38 is vertically movable by the piston 34 in accordance with the action of the pressure fluid in the cylinder 28, and is provided with a longitudinal slot 40. Blocks 42 are horizontally adjustable longitudinally of the bar 38 by means of set screws, 44 positioned in the slot 40.

Vertically slidable through the blocks 42 are rods 46, each of which is downwardly biased by a coil spring 48. These rods are connected at their lower ends to a plate 50. The plate 50 has end slots 52 and a plurality of rear slots 54 corresponding in number and position to the respective slots 18 and 20 in plate 16.

The platform 12 is provided with a plurality of grooves 56, here shown as three in number to correspond with the slots 20 and with the slots 54 in the plate 50. The central groove 56 is provided with a transverse slot 57 at its rear end, and through this slot 57 extends a vertically reciprocal finger 58 this finger 58 acting as a reciprocable stop and being mounted on a piston rod 60 that is upwardly biased by a coil spring 62 (best seen in FIG. 2). The slot 57 acts as a guide means for the finger 58. The rod 60 has a piston head 64 within a cylinder 66 that is supported by a bracket 67, and is operated by pneumatic or hydraulic pressure fluid flowing from and to a tank (not shown) through conduits 68 and 70. The pressure fluid is controlled by a solenoid (not shown) in the standard manner.

Figure 2:
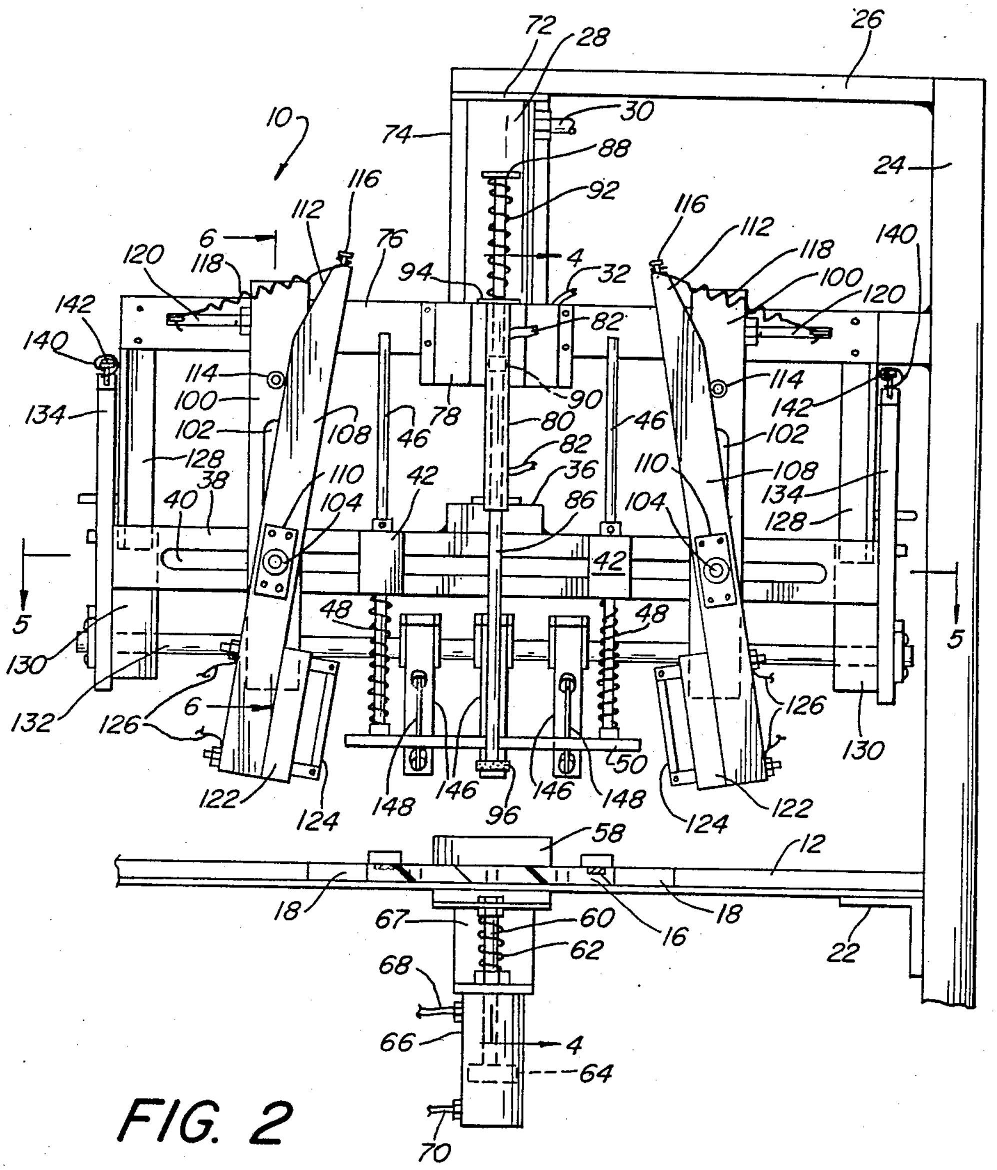
FIG. 2 is a rear elevational view of the machine of FIG. 1.

Connected between the flange 26 and the upper end of the cylinder 28 is the lateral portion 72 of a bracket 74 which is connected to and helps support a transverse bar 76 supported at one end by the post 24 (as best shown in FIG. 2). Extending forwardly from the bar 76 is a bracket 78. Mounted on the front of the bracket 78 is a cylinder 80 having ports connected to upper and lower conduits 82 and 84 leading to a tank (not shown) containing pressure fluid, either pneumatic or hydraulic. Vertically movable in this cylinder 80 is a piston rod 86 that extends upwardly from the cylinder and is provided at its upper end with a handle 88 but is also provided with an intermediate piston head 90 within the cylinder. A coil spring 92 surrounds the upper exposed portion of the rod 86 and bears at its lower end on a flange 94 on the cylinder and at its upper end on the handle 88, thereby biasing the rod upwardly. At its lower end, the rod 86 is provided with a pressure disc 96 forming a stop means. The rod 86 is, by means of this construction, adapted to be automatically actuated in a timed relation to other moving parts of the machine by actuation of the pressure fluid on the piston head or, in the alternative, manually actuated by means of the handle 88 at the upper end of the rod.

This stop means 96 is primarily intended for use in conjunction with the transverse conveyor hereinafter described but is included as part of the entire machine because the two types of conveyors may be alternatively used. When the front to rear conveyor, hereinafter described, is used, the above described stop means 96 is not operated but is still in position.

Support blocks 98 are mounted on the bar 76 and depending from each block is a plate 100. A slot 102 extends longitudinally of each plate, and extending through the slots 102 and through the slot 40 in bar 38 are set screws 104 which extend through bearing blocks 106 and pivotally support the respective arms 108. Bearing plates 110 hold the set screws 104 in place.

Each arm 108 is provided with a cam edge 112 at its upper end, these cam edges coacting with respective cam followers 114 extending forwardly from their respective plates 100. A pin 116 is positioned at the upper end of each arm 108 and these pins hold one end of a respective spring 118, the other ends being connected to a pin 120 extending laterally from the respective blocks 98. At the lower end of each arm 108 is a heat insulating block 122 from which extends a heat sealing blade 124. Electrical connections to a heating means (not shown) are provided at 126.

In operation, as the bar 38 is lowered, in accordance with the action on the piston head 36 within cylinder 28, the spring-pressed cam edges 112 coact with their respective followers 114 to pivot their respective arms 108 around set screws 104, thereby bringing their respective blades 124 into the respective slots 52 in the plate 50, this plate having been lowered into contact with a stack of bags by the downward movement of the bar 38. At the same time, the rod 86 is lowered into contact with the stack of bags by timing means (not shown) acting on the piston within the cylinder 80 by controlling the pressure fluid within the cylinder.

Depending from opposite end portions of the bar 76 are brackets 128. Bearing blocks 130 are connected to the bar 38. Between the blocks 130 extends a shaft 132. Mounted on said shaft 132 are oppositely disposed cam arms 134. Each arm 134 is provided with a cam edge 136 adapted to coact with a cam follower 138 on bracket 128. A spring 140 is connected to a pin 142 at the upper end of each arm 134 and to a pin 144 extending from the corresponding bracket 128, to bias each cam arm against the corresponding cam follower. Also mounted on the shaft 132 are a plurality of insulating blocks 146 (here shown as three in number) each of which is provided with a heat-sealing blade 148, corresponding to slots 54 in the plate 50. Connections to a heating means (not shown) are provided at 150.

In operation, as the bar 38 descends, it moves the arms 134 downward, causing their cam edges to coact with the respective cam rollers to cause the arm to straighten. This rotates the shaft 132 causing the blocks 146 to pivot so as to bring the heating blades 148 within the respective slots 45 in plate 50.

Figure 4:
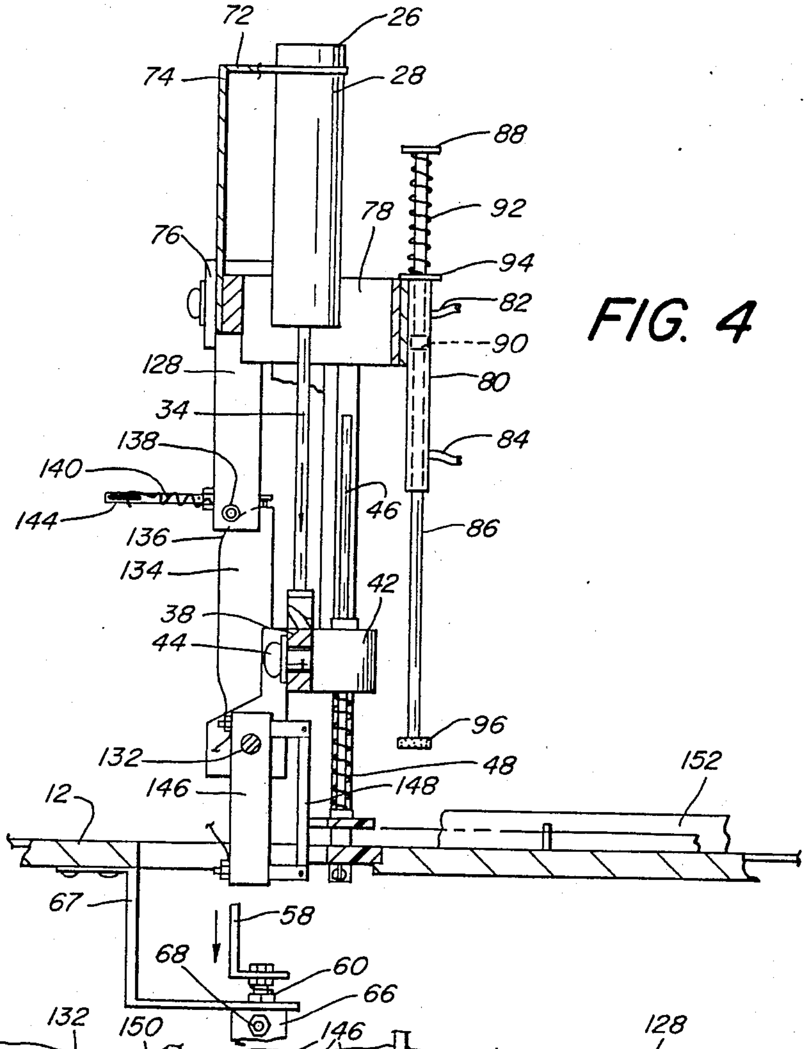
FIG. 4 is a sectional view taken on line 4—4 of FIG. 2.
Figure 5:
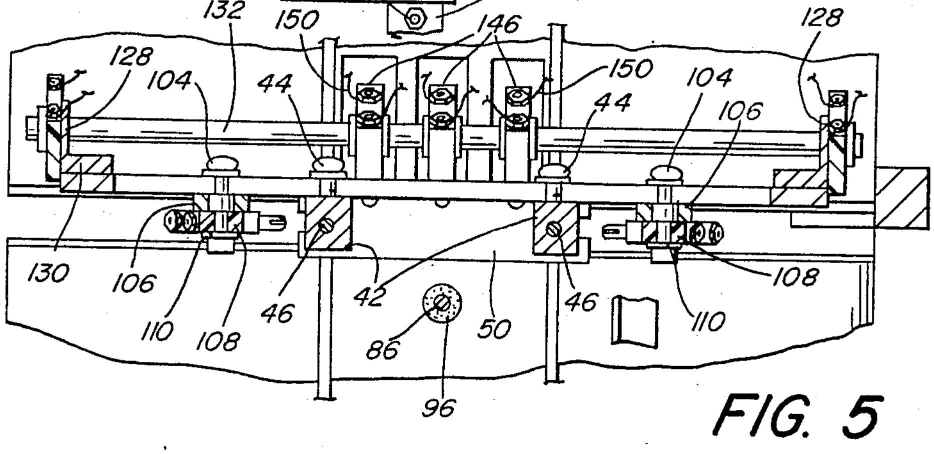
FIG. 5 is a sectional view taken on line 5—5 of FIG. 2.

The stack of bags, indicated generally at 152 in FIGS. 3 and 4, may be moved through the machine either from front to back or crosswise, as generally indicated in the respective FIGS. 7 and 8.

FIG. 7 shows a conveyor, generally designated 152, that comprises a plurality of belts 154. This is the conveyor that is also shown in FIG. 1. The belts 154 are so spaced that they do not overlap the grooves 56 and do not interfere with the operation of the other parts of the machine. Each belt 154 is provided with a series of fingers 156 spaced along its length. A reciprocating tray 158, shown in FIGS. 1 and 9, is used to feed a stack of bags into the conveyor in engagement with the fingers 156 and then withdraws. The conveyor then carries the stack under the plate 50 while the rod 86 moves downwardly to cause the stop 96 to temporarily hold the stack in position. The stop rod 86 and stop 96 are then retracted while, as the bar 38 moves down, the plate 50 moves upon the stack and the heat sealing blades 124 and 148 are moved against the stack. All of these actions are carried out in time relationship by well-known standard timing means.

FIG. 8 shows a conveyor system, generally designated 160, where a first set of belts 162 travel toward the sealing head to receive a stack of bags from the reciprocating tray 164, the stack resting against the fingers 166. The stack is then carried to a transversely traveling set of belts 168 having fingers 170. These belts carry the stack transversely through the sealing means and deposit the finished pads laterally of the machine.

Whether the type of conveyor shown in FIG. 7 or that shown in FIG. 8 is used, the finished pad is the same, such pad being shown at 172 in FIG. 10 and having side seals 174 and end seals 176.

The end seals 176 are optional and, if desired, may be omitted - in which case, the heat-sealing blades 148 and their accompanying structure may be omitted or made inoperative. However, when they are used, their structure and functioning permits the conveyor 152 to travel through the machine in a straight line direction so that the finished pads can be delivered at the opposite end of the machine. This was not possible with such prior machines as, for example, shown in applicant's aforesaid prior U.S. Pat. No. 4,468,276.

FIGS. 12 and 13 show a modified form of the invention that is used to make pads of the type shown in FIG. 11. The pads of FIG. 11 are similar to those of FIG. 10 and are provided with the same type of side seals, as shown at 178. However, in place of the end seals, such as shown at 176 in FIG. 10, these pads are provided with punched seals 180.

The structure shown in FIGS. 12 and 13 is similar to that described above and includes cam arms 182 having cam edges 184 that coact with cam followers 186 extending from plates 188 supported by bar 190 similar to the bar 76 in FIG. 1, and connected to the post 191. The cam arms are similarly biased by springs 192 extending between pins 194 on the cam arms and pins 196 connected to the plates 188. The cam arms 182 are also similarly pivoted to a guide bar 198 having a longitudinal slot 200 for lateral adjustment of the plates 188 and arms 182.

The post 191 is provided with a flange 202 that is welded or otherwise secured to the lateral flange 204 of a bracket 206 and the upper end of a cylinder 208 is welded or otherwise secured to the flange 202, all in the same manner as are provided between the flange 26, the lateral flange 72 of the bracket 74 and the cylinder 28 in FIG. 1.

Within the cylinder 208 is a piston 210 having a head 212. The cylinder is also provided with ports connected to conduits 214 and 216 leading to a source of pneumatic or hydraulic pressure fluid. The piston 210 is connected to and operates the bar 198 in the same manner as shown for similar parts in FIG. 1. The bar 198 is similarly provided with bearing blocks 218 through which extend rods 220 that are connected at their lower ends to a plate 222. Springs 224, similar to those shown at 48 in FIG. 1, encircle the rods 220 below the bar 198.

The plate 222 is similar to the plate 50 in that it is provided with side slots 223 to receive the heating blades 226 on the arms 182, but differs therefrom in that it is provided with apertures 228 instead of the end slots 54. A plurality of heated punches 230 (here shown as two in number) are biased upwardly by springs 232 and are held in heat insulating blocks 234 on the bar 198. Electrical lines 236 lead to a source of electrical energy.

The structure of FIG. 12 is also provided with a stop finger 238 connected to a piston 240 having a spring 242, the piston extending into a fluid pressure cylinder 244, all similar to the corresponding structure shown in FIG. 2.

The structure of FIGS. 12 and 13 operate in the same manner as that shown in FIGS. 1 to 8 except that the punches 230 form heat sealed holes 180 instead of end seals 176. These holes 180 act similarly to the end seals 176.

The invention claimed is:

1. A bag pad binding machine having a front and back and comprising a fixed platform, a conveyor movable over said platform, said conveyor being adapted to hold a stack of bags, feed means for moving said stack of bags onto said conveyor, intermittently-actuated stop means for holding said stack of bags in position on said platform for a predetermined interval of time, a vertically movable actuating means, sealing means operatively connected to said actuating means for sealing said stack of bags together to form a pad of bags upon vertical movement of said actuating means, said stop means being constructed and arranged to be retracted from said stack of bags prior to sealing thereof to permit passage of the resultant pad from the machine, said conveyor, said feed means and said sealing means being operated in intermittently-timed relationship with each other.

2. The machine of claim 1 wherein said conveyor is at least partially movable above said platform transversely of said machine relative to the front and back thereof.

3. The machine of claim 2 wherein at least a portion of said stop means comprises a vertically movable piston having a pressure disc at its lower end to contact the uppermost bag in said stack.

4. The machine of claim 3 wherein said vertically movable piston is adapted to be alternatively operated either manually or in intermittently-timed relationship with said conveyor, said feed means and said sealing means.

5. The machine of claim 1 wherein said conveyor is movable above said platform in a linear direction from front to back of the machine.

6. The machine of claim 5 wherein said stop means comprises a vertically movable finger movable from under said platform into a plane above said platform in timed conjunction with the movement of said conveyor.

7. The machine of claim 1 wherein said conveyor comprises a plurality of parallel belts.

8. The machine of claim 1 wherein said sealing means comprises at least one set of heated sealing means movable into and out of engagement with the opposite sides of said stack of bags upon downward movement of said actuating means and movable away from said stack of bags upon upward movement of said actuating means.

9. The machine of claim 1 wherein said feed means is a reciprocable tray movable into and out of position on said conveyor.

10. A bag pad binding machine having a front and back and comprising a platform, a conveyor movable over said platform, said conveyor being adapted to hold a stack of bags, feed means for moving said stack of bags onto said conveyor, intermittently-actuated stop means for holding said stack of bags in position on said platform for a predetermined interval of time, a vertically movabale actuating means, sealing means operatively connected to said actuating means for sealing said stack of bags together to form a pad of bags upon vertical movement of said actuating means, said stop means being constructed and arranged to be retracted from said stack of bags prior to sealing thereof to permit passage of the resultant pad from the machine, said conveyor, said feed means and said sealing means being operated in intermittently-timed relationship with each other, said sealing means comprising at least one set of heated sealing means movable into and out of engagement with the opposite sides of said stack of bags upon downward movement of said actuating means and movable away from said stack of bags upon upward movement of said actuating means, and a second set of heated sealing means movable substantially simultaneously with said one set of heated sealing means, said second set being movable into contact with said stack of bags in a transverse direction relative to the movement of said first set.

11. The machine of claim 10 wherein said second set comprises at least one heated sealing blade movable against the rear edge of said stack of bags.

12. The machine of claim 10 wherein said second set comprises at least one heated punch means vertically movable into and out of engagement with said stack of bags.

13. A bag pad binding machine having a front and back and comprising a platform, a conveyor movable over said platform, said conveyor being adapted to hold a stack of bags, feed means for moving said stack of bags onto said conveyor, intermittently-actuated stop means for holding said stack of bags in position on said platform for a predetermined interval of time, a vertically movable actuating means, sealing means operatively connected to said actuating means for sealing said stack of bags together to form a pad of bags upon vertical movement of said actuating means, said stop means being constructed and arranged to be retracted from said stack of bags prior to sealing thereof to permit passage of the resultant pad from the machine, said conveyor, said feed means and said sealing means being operated in intermittently-timed relationship with each other, said sealing means comprising a first pair of oppositely disposed cam arms having cam edges in operative engagement with respective cam followers, and a heated blade connected to each cam arm, each cam arm being pivotally movable by contact between their cam edges and the corresponding cam followers upon vertical movement of said actuating means, and a second pair of oppositely-disposed cam arms in engagement with respective cam followers, a heated blade connected to each of the last-mentioned cam arms, said last-minute cam arms being pivotally movable by contact between their cam edges and their respective cam followers upon vertical movement of said actuating means, and the blades of said second pair being movable into edge contact with said stack of bags in a transverse direction relative to the movement of the blades of said first pair.

14. The machine of claim 13 wherein the blades of said first pair are movable into and out of engagement with the sides of said stack of bags and the blades of said second pair are movable into and out of engagement with the rear edge of said stack of bags.

* * * * *